United States Patent [19]

Etzbach et al.

[11] Patent Number: 4,943,617
[45] Date of Patent: Jul. 24, 1990

[54] LIQUID CRYSTALLINE COPOLYMER

[75] Inventors: Karl-Heinz Etzbach, Frankenthal; Bernd Hisgen, Limburgerhof, both of Fed. Rep. of Germany

[73] Assignee: BASF Aktiengesellschaft, Ludwigshafen, Fed. Rep. of Germany

[21] Appl. No.: 91,667

[22] Filed: Sep. 1, 1987

[30] Foreign Application Priority Data

Sep. 19, 1986 [DE] Fed. Rep. of Germany ....... 3631841

[51] Int. Cl.$^5$ ................................................. C08F 8/32
[52] U.S. Cl. ............................... 525/329.9; 525/330.5; 525/375; 525/376; 525/380; 526/258; 526/266; 526/280; 526/284
[58] Field of Search ......................... 525/329.9, 330.5; 526/258, 266, 280, 284

[56] References Cited

U.S. PATENT DOCUMENTS 4,358,391 11/1982 Finkelmann et al. .
4,410,570 10/1983 Kreuzer et al. .
4,631,328 12/1986 Ringsdorf et al. .
4,657,842 4/1987 Finter et al. .

FOREIGN PATENT DOCUMENTS 0090282 3/1983 European Pat. Off. .
0171045 2/1986 European Pat. Off. .

OTHER PUBLICATIONS

Hans Kelker/Rolf Hatz, *Handbook of Liquid Crystals,* Verlag Chemie 1980; pp. 87–113.

*Primary Examiner*—Bernard Lipman
*Attorney, Agent, or Firm*—Oblon, Spivak, McClelland, Maier & Neustadt

[57] ABSTRACT

A liquid crystalline copolymer contains a comonomer to which a radical

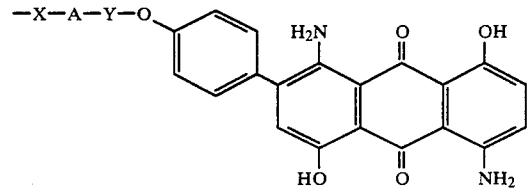

is bonded, where X is a chemical bond, O or $NR^1$, Y is a chemical bond or —CO—, $R^1$ is hydrogen or $C_1$–$C_4$-alkyl and A is a linear or branched $C_2$–$C_{20}$-alkylene group which may be interrupted by —O— or $$-\overset{|}{N}R^1.$$

The liquid crystalline copolymers have very good lightfastness, high dichroism and a high absorption.

11 Claims, No Drawings

LIQUID CRYSTALLINE COPOLYMER

The prior art discloses polymers which have liquid crystalline properties and in which the radicals leading to the meso phase are bonded to the polymer main chain via flexible spacers, as side chains.

An overview is given in, for example, Liquid Crystal Polymers I-III in Adv. Polym. Sci. 59-61, M. Gordon and N. A. Platé, Springer-Verlag, 1984, Berlin.

Suitable polymer main chains are polyacrylates or polymethacrylates (e.g. DE-A No. 27 22 589) or polysiloxanes (EP-A No. 29 162).

Compared with low molecular weight liquid crystals, these polymers have the advantage that the structure remains unchanged during the transition from the liquid crystalline phase to the solid phase, permitting freezing of a liquid crystalline structure in the glassy state.

Copolymers having mesogenic groups and dye radicals in the side chain are described in EP-A No. 90 282 and can be used in electrooptical displays or for information storage (EP-A No. 171 045). For these applications, it is important that the properties of the dyes are optimized for the particular use.

It is an object of the present invention to provide liquid crystalline copolymers which carry a dye radical having high dichroism, very good lightfastness and a high molar extinction. The absorption maximum of the dye should be in the range of the He-Ne laser emission (633 nm).

We have found that this object is achieved by the liquid crystalline copolymers according to the invention. Accordingly, the present invention relates to a liquid crystalline copolymer which contains, as copolymerized units, a comonomer which carries a dye-containing radical of the general formula

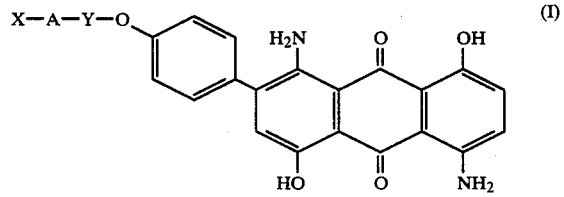

where X is a chemical bond, —O— or —NR$^1$, Y is a chemical bond or —CO—, R$^1$ is hydrogen or C$_1$-C$_4$-alkyl and A is a linear or branched C$_2$-C$_{20}$-alkylene group, and the carbon chain of the alkylene group can be interrupted by —O— or

The novel copolymers can be used in particular together with low molecular weight liquid crystals or liquid crystal mixtures in electrooptical displays of the guest-host type and serve in this respect as solubilizers for the dye. Compared with the blue dyes described in EP-A No. 90 282, the dye radical present in the novel copolymers has the advantage of very good lightfastness coupled with high dichroism. Furthermore, the molar extinction coefficient ε is substantially higher than in the case of the 1,4-diaminoanthraquinones of EP-A No. 90 282.

The novel copolymers can contain up to 45% by weight, based on the copolymer, of a dye. As a rule, the dye content is from 0.5 to 40, preferably from 0.8 to 30%, by weight, based on the copolymer. Another important technical use of the copolymers according to the invention is for information storage. Since very high absorption storage in a very thin polymer layer (generally about 0.1-1 μm) is required here, a very high molar extinction coefficient is a technical advantage. Moreover, the absorption maximum of the novel dye system used is tailored to the He-Ne laser emission.

Suitable liquid crystalline polymers are those which carry a mesogenic group R$^3$ bonded to the main chain via a spacer. The spacer serves here for decoupling the mesogenic group from the main chain and permits independent movement of the mesogenic group. A preferrred spacer A is a linear or branched C$_2$-C$_{20}$-alkylene group, which may be interrupted by —O— or

Mesogenic groups R$^3$ are mentioned, inter alia, in Kelker and Hatz, Handbook of Liquid Crystals, Verlag Chemie 1980, pages 87-113.

Suitable polymer main chains are polyacrylates or polymethacrylates (e.g. DE-A No. 27 22 589) or polysiloxanes (EP-A No. 29 162).

Preferred liquid crystalline copolymers are those of the general formula

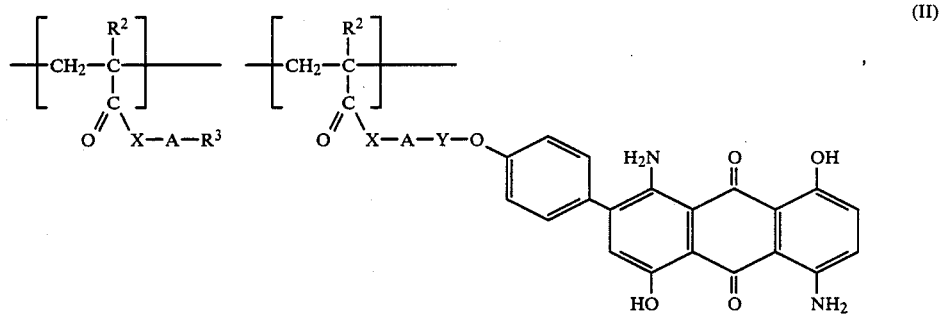

where R$^2$ is hydrogen, methyl or chlorine, X is —O— or

—NR$^1$,

Y is a chemical bond or —CO—, $R^1$ is hydrogen or $C_1$-$C_4$-alkyl, A is a linear or branched $C_2$-$C_{20}$-alkylene group which may be interrupted by —O— or

and $R^3$ is a mesogenic group, and the copolymer may carry identical or different mesogenic groups.

Specific examples of A are —(CH$_2$)$_2$—, —(CH$_2$)$_3$—, —(CH$_2$)$_4$—, —(CH$_2$)$_5$—, —(CH$_2$)$_6$—, —(CH$_2$)$_7$—, —(CH$_2$)$_8$—, —(CH$_2$)$_9$—, —(CH$_2$)$_{10}$—, —(CH$_2$)$_{11}$—, —(CH$_2$)$_2$—O—(CH$_2$)$_2$—,

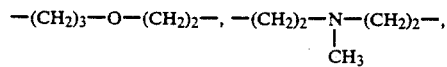

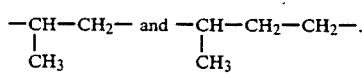

Y is preferably a chemical bond.
Examples of mesogenic groups $R^3$ are:

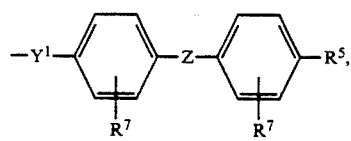

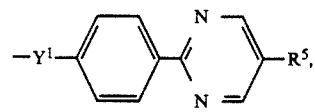

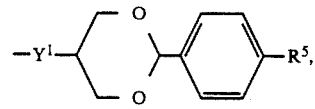

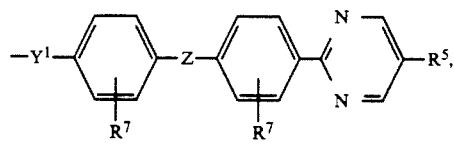

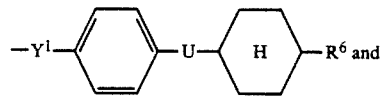

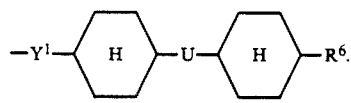

where $Y^1$ is —O—,

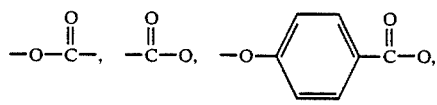

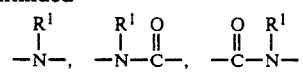

or —S—, Z is a chemical bond or a radical of the formula

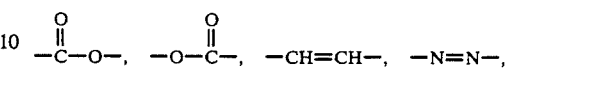

U is a chemical bond or a radical of the formula

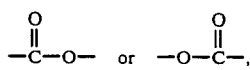

$R^5$ is hydrogen, $C_1$-$C_{12}$-alkyl, $C_5$-$C_7$-cycloalkyl, $C_1$-$C_{12}$-alkoxy, $C_4$-$C_{12}$-alkoxycarbonyl, $C_1$-$C_{12}$-alkanoyloxy, fluorine, chlorine, bromine, cyano, phenyl, 4-cyanophenyl or nitro, $R^6$ is hydrogen, $C_1$-$C_{12}$-alkyl, $C_1$-$C_{12}$-alkoxy or $C_1$-$C_{12}$-alkoxycarbonyl and $R^7$ is methyl, ethyl, methoxy, ethoxy or chlorine.

Particularly preferred liquid crystalline copolymers of the general formula (II) are those where $R^2$ is hydrogen or methyl, X is —O—, Y is a chemical bond, A is a linear $C_2$-$C_{20}$-alkylene group, $R^3$ is

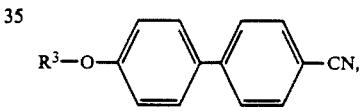

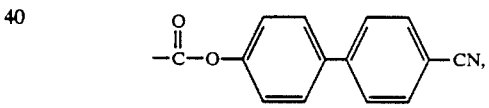

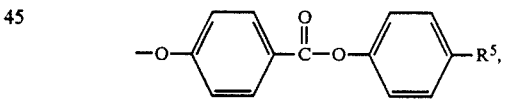

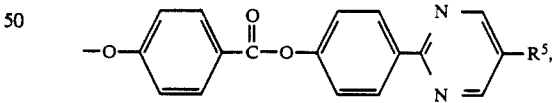

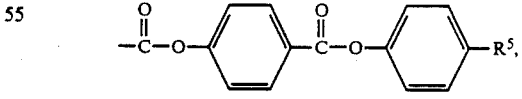

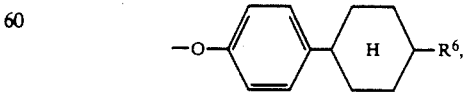

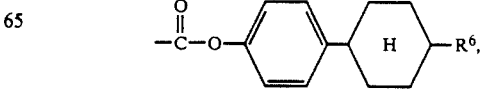

-continued

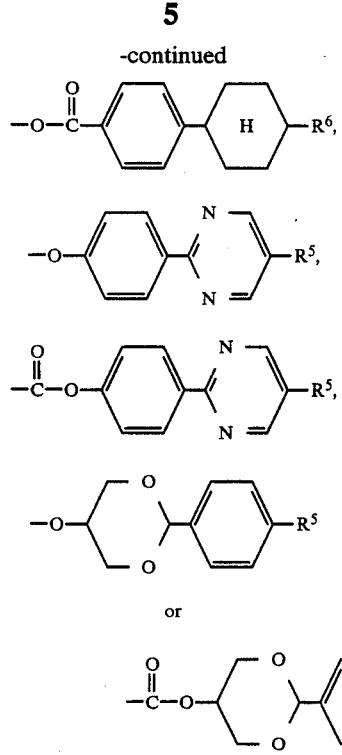

$R^5$ is $C_1$-$C_{12}$-alkyl, $C_1$-$C_{12}$-alkoxy, $C_4$-$C_{12}$-alkoxycarbonyl, $C_1$-$C_{12}$-alkanoyloxy, fluorine, chlorine, cyano, phenyl, 4-cyanophenyl or nitro and $R^6$ is $C_1$-$C_{12}$-alkyl.

Further examples are liquid crystalline polymers of the general formula (III)

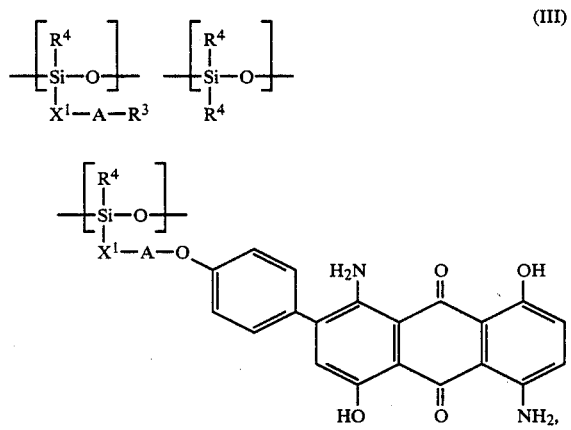
(III)

where A and $R^3$ have the meanings given above, $X^1$ is a chemical bond and $R^4$ is ethyl, propyl, butyl, phenyl or, preferably, methyl.

Liquid crystalline copolymers which contain optically active groups are also important. The optically active groups may be present in the spacer A or in the radical $R^3$, in the latter case preferably in the radicals $R^5$ or $R^6$.

Specific examples of optically active groups are for A:  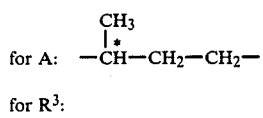

for $R^3$:

-continued

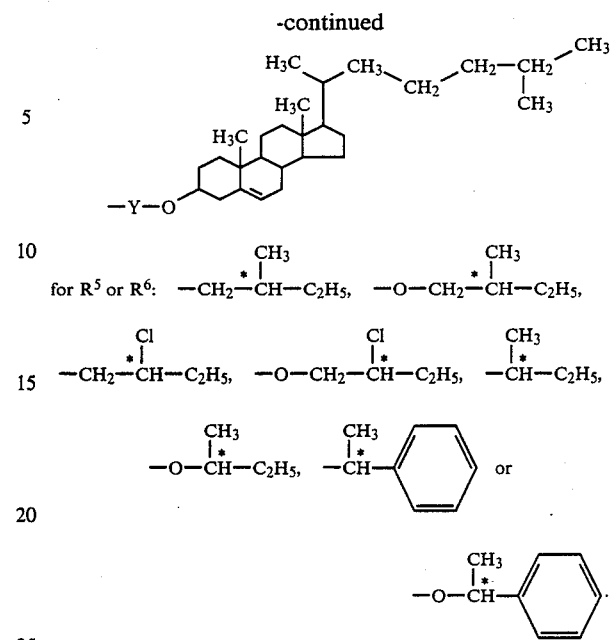

Such copolymers can form cholesteric or chiral smectic phases.

The copolymers can be prepared by conventional methods usually employed in polymer chemistry.

The novel polyacrylates and polymethacrylates can be prepared, for example, by copolymerizing the monomers

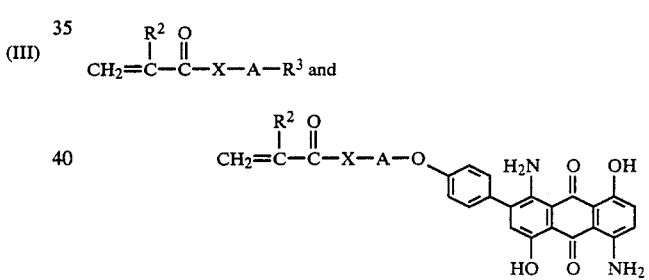

by a conventional method.

The synthesis of the mesogenic monomers is described, for example, in German Laid-Open Application DOS No. 2,722,589 or by V. P. Shibaev et al. in Eur. Polym. J. 18 (1982), 651–659.

The novel polyacrylates and polymethacrylates can also be prepared by introducing the radicals X—A—$R^3$ and X—A—dye into polymeric compounds of the formula

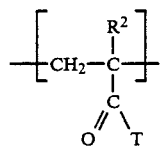

where T is an exchangeable radical, for example chlorine or lower molecular weight alkoxy, by esterification, transesterification or amidation by a conventional method (C. M. Paleos et al. in J. Polym. Sci. Polym. Chem. Ed. 19 (1981), 1427).

The alkylation of the polymeric compounds of the formula

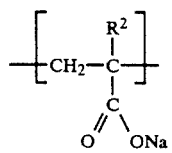

with halides of the formula Hal—A—R$^3$ and Hal—A—dye (where Hal is Cl, Br or I) is also possible and is carried out by a conventional method (P. Keller in Macromolecules 17 (1984), 2937–2939).

The novel dye-containing polysiloxanes can be prepared by processes similar to those described in EP-A No. 29 162 or EP-A No. 60 335 or by introducing mesogenic groups R$^3$ and the dye radical

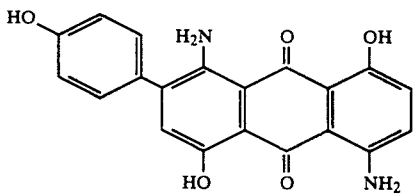

into polymeric compounds of the formula

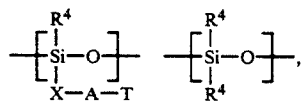

where X, A and R$^4$ have the abovementioned meanings and T is an exchangeable or reactive radical, for example Cl, Br, COOH, COCl or CO$_2$-alkyl, by etherification, esterification or transesterification by conventional methods.

Details of the preparation are given in the Examples.
A. Synthesis of the dye monomers

EXAMPLE 1

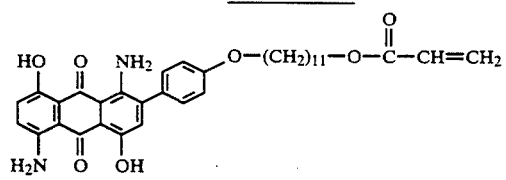

(a) Preparation of 11-bromoundecyl acrylate

A solution of 50.2 g of 11-bromoundecanol, 72 g of acrylic acid, 3 g of p-toluenesulfonic acid and 0.1 g of hydroquinone in 120 ml of 1,1,1-trichloroethane is heated at the boil for 4 hours under a water separator. After the solution has cooled, it is extracted by shaking with warm water, then with an aqueous sodium bicarbonate solution and then again with water and is dried over sodium sulfate. Thereafter, the solvent is stripped off under reduced pressure in a rotary evaporater and the remaining oil is distilled under greatly reduced pressure. 45.1 g (75% of theory) of a colorless oil of boiling point 113° C./0.2 mbar are obtained.

(b) Preparation of 4,8-diamino-1,5-dihydroxy-3-(4-hydroxyphenyl)-anthraquinone 120 g of 4,8-diamino-1,5-dihydroxyanthraquinone-2,6-disulfonic acid are added to a solution of 60 g of boric acid in 1200 ml of sulfuric acid at 70° C., and the mixture is then stirred for 1 hour at 70° C. The deep blue solution is cooled to 5° C., after which 52.6 parts of phenol are introduced a little at a time so that the temperature does not exceed 5° C. When the addition is complete, the mixture is stirred for a further 2 hours at 5° C. and then added to 4 kg of ice water. The resulting suspension is heated at the boil for a further 4 hours and, after the mixture has cooled, the precipitate is filtered off under suction and washed with water.

The moist residue is dissolved in a mixture of 360 ml of concentrated ammonia and 800 ml of water, after which 66 g of sodium dithionite are added a little at a time and the reaction mixture is stirred for 5 hours at 80°–90° C. After the mixture has cooled, 11.2 g of sodium hydroxide are added and air is passed through the mixture overnight. Thereafter, the mixture is acidified with dilute hydrochloric acid, and the precipitate is filtered off under suction, washed with water and dried to give 61 g (60% of theory) of a crude product, which is purified by recrystallization from 600 ml of nitrobenzene. Mp. 321° C.

(c) Preparation of 4,8-diamino-1,5-dihydroxy-3-(4-(11-propenoyloxyundecyloxy)-phenyl)-anthraquinone.

A mixture of 7.2 g of 4,8-diamino-1,5-dihydroxy-3-(4-hydroxyphenyl)-anthraquinone, 6.7 g of 11-bromoundecyl acrylate, 2.8 g of potassium carbonate, 0.5 g of potassium iodide and 80 ml of dimethylformamide is stirred for 7 hours at 80° C., poured onto ice water and acidified slightly with dilute hydrochloric acid, and the precipitate is filtered off under suction, washed with water and dried to give 11.8 g of crude product, which is purified by chromatography over silica gel (Merck, Kieselgelb 60, 0.063–0.200 mm) using 10:1 tolune/tetrahydrofuran as an eluent, followed by recrystallization from toluene. Mp. 135° C., $\lambda_{max}$ (CH$_2$Cl$_2$): 623 nm (27,470) C$_{34}$H$_{38}$N$_2$O$_7$(586) calculated: 69.6% C, 6.5% H, 4.8% N, 19.1% O, Found: 69.5% C, 6.6% H, 4.7% N, 18.9% O.

The dyes of Examples 2 to 7 are prepared by a method similar to that described in Example 1, by alkylation of 4,8-diamino-1,5-dihydroxy-(4-hydroxyphenyl)anthraquinone with the appropriate halides.

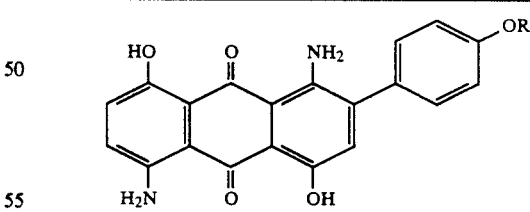

| Example | | Mp. |
|---|---|---|
| 2 | —(CH$_2$)$_6$—O—C(=O)—CH=CH$_2$ | 136° C. (from toluene) |
| 3 | —(CH$_2$)$_3$—O—C(=O)—CH=CH$_2$ | 164° C. (from toluene) |
| 4 | —(CH$_2$)—O—C(=O)—C(CH$_3$)=CH$_2$ | 136° C. (from toluene) |
| 5 | —(CH$_2$)$_9$—CH=CH$_2$ | |
| 6 | —(CH$_2$)$_{11}$—OH | 175° C. (from methyl- |

-continued

[Structure: 1,8-dihydroxy-4,5-diamino anthraquinone with 4-OR-phenyl substituent]

| Example | Mp. |
|---|---|
| | glycol) |
| 7 | —(CH$_2$)$_6$—Br |

Table 1 shows the order S measured in commercial displays (polyimide orientation) at room temperature at ZLI 1840 (E. Merck), the absorption maximum $\lambda_{max}$ and the solubility L measured at room temperature at ZLI 1840 for the dye-containing monomers of Examples 1 to 3.

TABLE 1

| Example | Order S | $\lambda_{max}$ | Solubility L |
|---|---|---|---|
| 1 | 0.71 | 642 nm | 1.3% |
| 2 | 0.70 | 641 nm | 3.2% |
| 3 | 0.68 | 641 nm | 1.1% |

B. Synthesis of the copolymers

Polyacrylates, polymethacrylates and polychloroacrylates are prepared by the following general method.

General polymerization method:

In a swinging vessel, azobisisobutyronitrile is added to a monomer solution consisting of 10% by weight of a mixture of dye monomer and mesogenic monomer in absolute tetrahydrofuran or absolute dioxane. Nitrogen is passed through for 10 minutes, after which the monomer solution is thermostated at 60° C. (tetrahydrofuran) or 70° C. (dioxane). When polymerization is complete, the polymers are separated from the monomers by exclusion chromatography over the system Sephadex LH 20/tetrahydrofuran. After the tetrahydrofuran has been removed, the polymer is dried under greatly reduced pressure. The quantitative composition of the copolymers is determined by UV spectroscopy and elemental analysis. The phase transition temperatures are determined by differential calorimetry. The liquid crystalline phases are assigned on the basis of the textures observed under a polymerization microscope equipped with a heating stage.

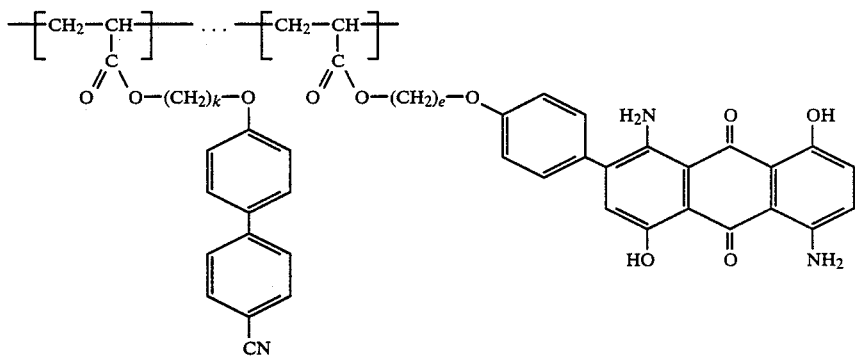

The copolymers of 4-(6-propenoyloxy)-alkoxy-4'-cyanobiphenyl and 4,8-diamino-1,5-dihydroxy-3-(4-(11-propenoyloxyalkoxy)-phenyl)-anthraquinone were prepared in dioxane by the general method, the amount of dye monomers being varied. The polymers purified according to the stated method form smectic and nematic textures when heated on the heating stage of the polarization microscope.

Table 2 summarized the dye contents of the copolymers, together with the results of the investigations by differential calorimetry and under the polarization microscope (g: glassy, s: smectic, n: nematic, i: isotropic).

TABLE 2

| Example | k | l | Initiator (mol %) | Mesog. monom. (g) | Dye monom. (g) | Dye content (% by wt.) | Phase transitions (°C.) |
|---|---|---|---|---|---|---|---|
| 8a | 2 | 6 | 1 | 1.96 | 0.04 | 2 | g 53 n 108 i |
| 8b | 5 | 6 | 1 | 1.80 | 0.20 | 10 | g 48 s 103 n 111 i |
| 8c | 6 | 6 | 5 | 1.96 | 0.04 | 2 | g 41 s 111 n 123 i |
| 8d | 6 | 6 | 1 | 2.94 | 0.06 | 2 | g 40 s 117 n 127 i |
| 8e | 6 | 6 | 1 | 2.70 | 0.30 | 10 | g 42 s 116 n 123 i |
| 8f | 6 | 6 | 1 | 2.55 | 0.45 | 14.8 | g 43 s 146 n 119 i |
| 8g | 6 | 11 | 3 | 1.96 | 0.04 | 2 | g 40 s 117 n 128 i |
| 8h | 6 | 11 | 3 | 2.70 | 0.30 | 10 | g 42 s 115 n 125 i |
| 8i | 6 | 11 | 3 | 1.70 | 0.30 | 14.5 | g 43 s 114 n 123 i |
| 8k | 6 | 11 | 3 | 3.20 | 0.80 | 19 | g 45 s 112 n 119 i |

Example 9

TABLE 2-continued

| Example | k | l | Initiator (mol %) | Mesog. monom. (g) | Dye monom. (g) | Dye content (% by wt.) | Phase transitions (°C.) |
|---------|---|---|-------------------|-------------------|----------------|------------------------|-------------------------|

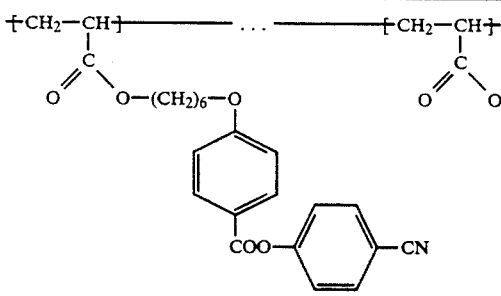

The copolymers of 4'-cyanophenyl 4-(6-propenoyloxy)-hexyloxybenzoate and 4,8-diamino-1,5-dihydroxy-3-(4-(11-propenoyloxyundecyloxy)-phenyl)-anthraquinone were prepared in dioxane using 3 mol % of AIBN, by the general method, the amount of dye monomer being varied. The polymers form nematic textures.

Table 3 summarizes the dye contents of the copolymers, together with the results of the investigations by differential calorimetry and under the polymerization microscope (g: glassy, n: nematic, i: isotropic).

The copolymers of 4'-methoxyphenyl 4-(6-propenoyl-oxy)-hexyloxybenzoate and 4,8-diamino-1,5-dihydroxy-3-(4-(11-propenoyloxyundecyloxy)-phenyl)-anthraquinone were prepared in dioxane using 3 mol % of AIBN, by the general method, the amount of dye monomer being varied. The polymers form smectic and nematic phases.

Table 4 summarizes the dye contents of the copolymers, together with the results of the investigations by differential calorimetry and under the polymerization microscope (g: glassy, $s_A$: smectic A, n: nematic, i: iso-

TABLE 3

| Example | Mesogenic monomer (g) | Dye monomer (g) | Dye content (% by wt.) | Phase transitions (°C.) |
|---------|------------------------|------------------|-------------------------|--------------------------|
| 9a | 1.96 | 0.04 | 2 | g 33 n 128 i |
| 9b | 1.80 | 0.20 | 10 | g 33 n 118 i |
| 9c | 3.20 | 0.80 | 19.5 | g 35 n 109 i |
| 9d | 3.00 | 1.00 | 24 | g 36 n 106 i |

EXAMPLE 10

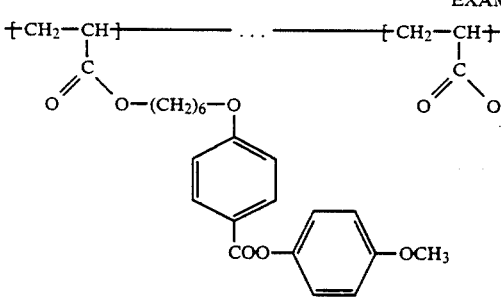

tropic).

TABLE 4

| Example | Mesogenic monomer (g) | Dye monomer (g) | Dye content (% by wt.) | Phase transitions (°C.) |
|---------|------------------------|------------------|-------------------------|--------------------------|
| 10a | 3.92 | 0.08 | 2 | g 30 $s_A$ 94 n 117 i |
| 10b | 3.60 | 0.40 | 9.8 | g 32 $s_A$ 91 n 111 i |
| 10c | 3.20 | 0.80 | 19.3 | g 33 $s_A$ 87 n 105 i |

EXAMPLE 11

TABLE 4-continued
| Example | Mesogenic monomer (g) | Dye monomer (g) | Dye content (% by wt.) | Phase transitions (°C.) |
|---|---|---|---|---|
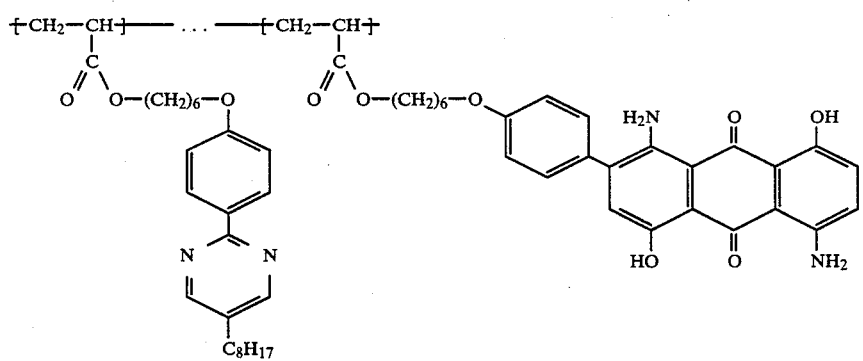
EXAMPLE 13
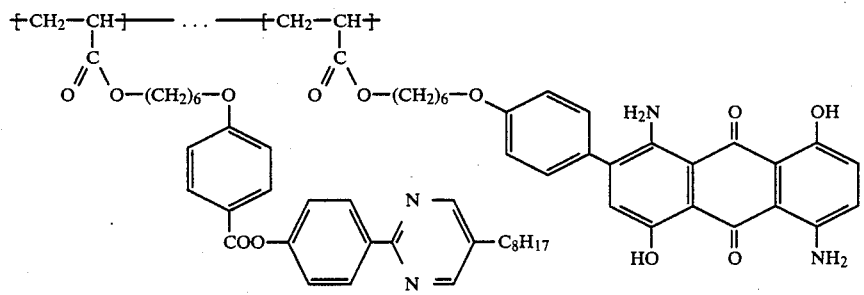
EXAMPLE 14
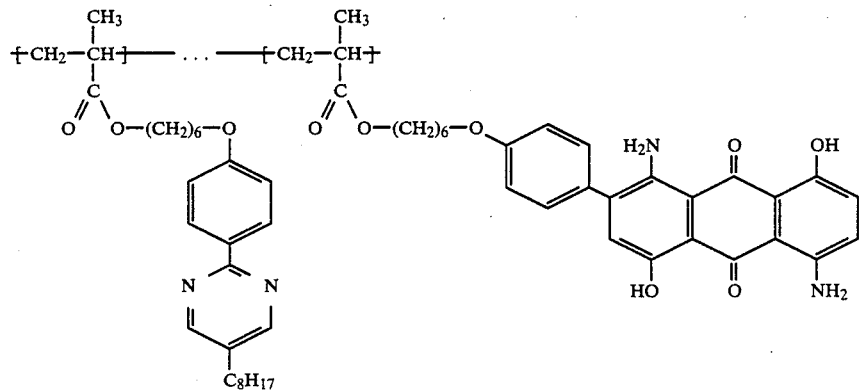
EXAMPLE 15

TABLE 4-continued

| Example | Mesogenic monomer (g) | Dye monomer (g) | Dye content (% by wt.) | Phase transitions (°C.) |
|---------|----------------------|-----------------|------------------------|-------------------------|

Example 15: Copolymer with methacrylate backbone; mesogenic side group —C(=O)O—(CH$_2$)$_6$—O—C$_6$H$_4$—COO—C$_6$H$_4$—OCH$_3$; dye side group —C(=O)O—(CH$_2$)$_{11}$—O—C$_6$H$_4$— linked to 1,5-diamino-4,8-dihydroxyanthraquinone.

EXAMPLE 16

Copolymer with methacrylate backbone; mesogenic side group —C(=O)O—(CH$_2$)$_6$—O—C$_6$H$_4$—COO—C$_6$H$_4$—OCH$_3$; dye side group —C(=O)O—(CH$_2$)$_6$—O—C$_6$H$_4$— linked to 1,5-diamino-4,8-dihydroxyanthraquinone.

EXAMPLE 17

Copolymer with α-chloroacrylate backbone (Cl substituent); mesogenic side group —C(=O)O—(CH$_2$)$_6$—O—C$_6$H$_4$—COO—C$_6$H$_4$—OC$_4$H$_9$; dye side group —C(=O)O—(CH$_2$)$_6$—O—C$_6$H$_4$— linked to 1,5-diamino-4,8-dihydroxyanthraquinone.

EXAMPLE 18

Copolymer with acrylate backbone; mesogenic side group —C(=O)O—(CH$_2$)$_6$—O—C$_6$H$_4$—COO—C$_6$H$_4$—O—CH$_2$—CH(CH$_3$)—CH$_2$—CH$_3$; dye side group —C(=O)O—(CH$_2$)$_{11}$—O—C$_6$H$_4$— linked to 1,5-diamino-4,8-dihydroxyanthraquinone.

The polymerization conditions and the results of the investigations for Examples 11-18 are summarized in Table 5:

TABLE 5

| Example | Solvent | Initiator (mol %) | Mesog. monom. (g) | Dye monom. (g) | Dye content (% by wt.) | Phase transitions (°C.) |
|---------|---------|-------------------|-------------------|----------------|------------------------|-------------------------|
| 11a | dioxane | 3 | 1.98 | 0.02 | 1 | g 3 n 31 i |

TABLE 5-continued

| Example | Solvent | Initiator (mol %) | Mesog. monom. (g) | Dye monom. (g) | Dye content (% by wt.) | Phase transitions (°C.) |
|---|---|---|---|---|---|---|
| 11b | " | 3 | 1.95 | 0.05 | 2.5 | g 1 n 28 i |
| 12 | " | 1 | 3.92 | 0.08 | 2 | g 12 s 91 i |
| 13 | " | 1 | 3.92 | 0.08 | 2 | g 28 n 153 i |
| 14 | " | 1 | 1.96 | 0.04 | 2 | g 33 s 90 i |
| 15 | " | 1 | 2.94 | 0.06 | 2 | g 88 n 106 i |
| 16 | " | 1 | 2.94 | 0.06 | 2 | g 43 n 109 i |
| 17 | " | 3 | 1.96 | 0.04 | 2 | g 33 s 98 i |
| 18 | " | 2 | 4.50 | 0.50 | 10 | |

EXAMPLE 19

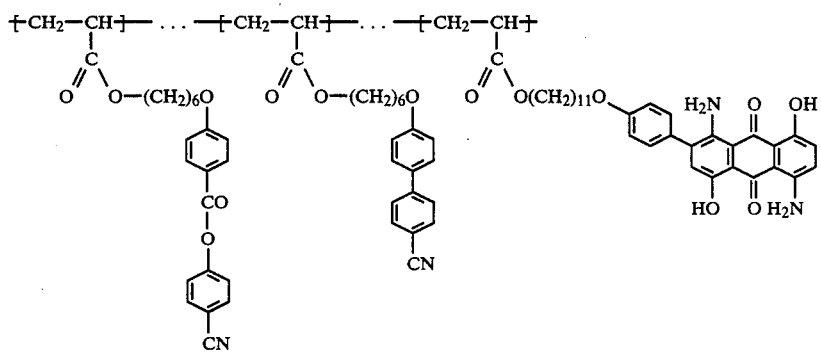

The copolymer of 1.8 g (45 parts by weight) of 4'-cyanophenyl 4-(6-propenoyloxy)-hexyloxybenzoate, 1.8 g (45 parts by weight) of 4-(6-propenoyloxy)-hexyloxy-4'-cyanobiphenyl and 0.40 g (10 parts by weight) of 4,8-diamino-1,5-dihydroxy-3-(4-(11-propenoyloxyundecyloxy)-phenyl)-anthraquinone was prepared in dioxane using 3mol % of AIBN, by the general method. The copolymer has the following phase behavier: g 35 s 110 n 118 i (temperatures in °C.: g: glassy, s: smectic, n: nematic, i: isotropic).

EXAMPLE 20

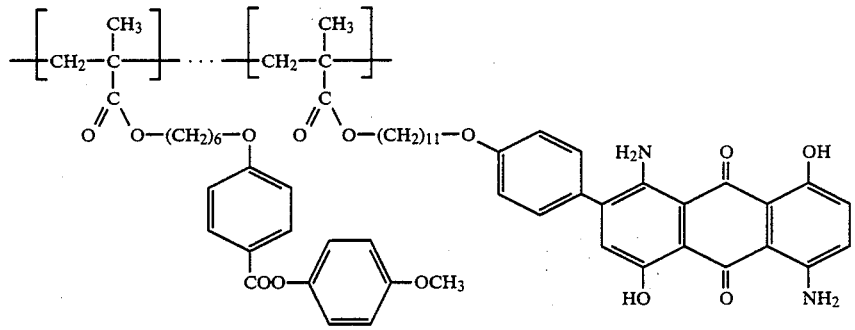

EXAMPLE 21

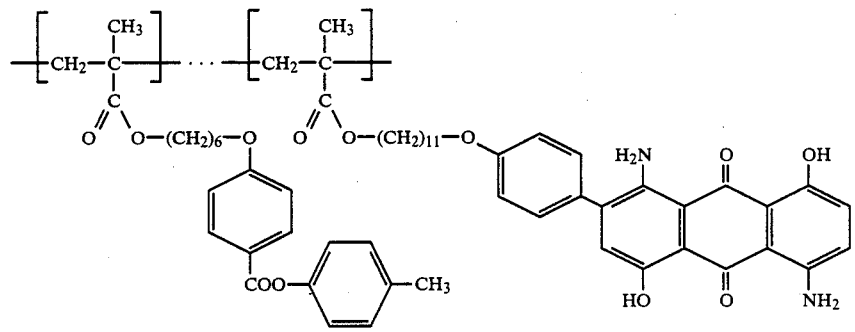

EXAMPLE 22

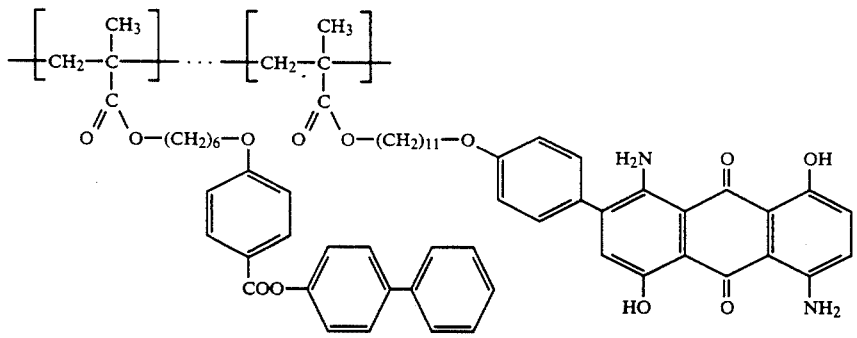

EXAMPLE 23

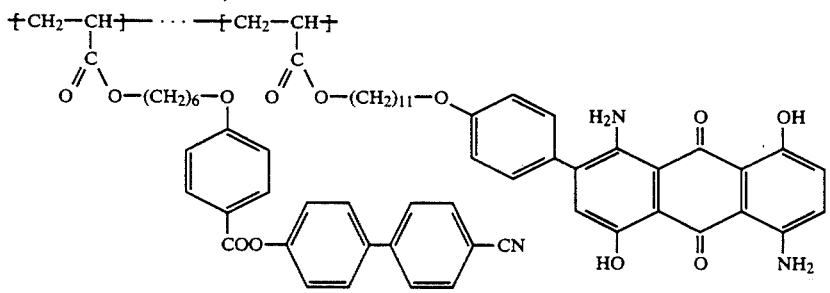

EXAMPLE 24

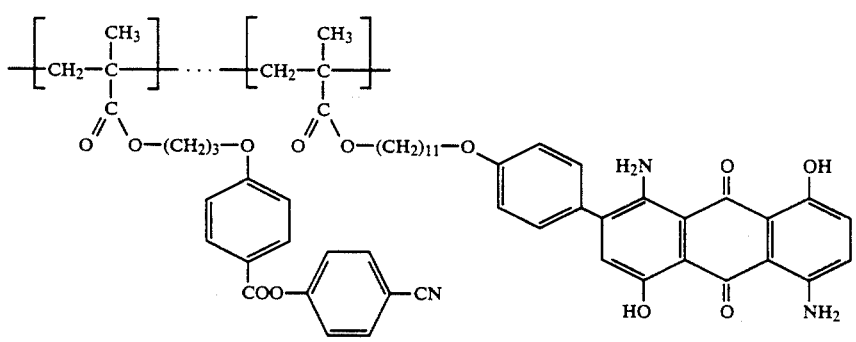

The polymerization conditions and the results of the investigations for Examples 20–24 are summarized in Table 6:

TABLE 6

| Example | Solvent | Initiator (mol %) | Mesog. monom. (g) | Dye monom. (g) | Dye content (% by wt.) | Phase transitions (°C.) |
|---|---|---|---|---|---|---|
| 20a | toluene | 1 | 9 | 1 | 10.3 | g 56 n 111 i |
| 20b | toluene | 2 | 8 | 2 | 19.1 | g 60 n 109 i |
| 21a | toluene | 2 | 9 | 1 | 9.7 | g 58 n 87 i |
| 21b | toluene | 2 | 2.4 | 0.6 | 19.7 | g 66 n 87 i |
| 22 | toluene | 1 | 9 | 1 | 9.4 | g 80 s 169 i 180 i |
| 23 | toluene | 3 | 8 | 2 | 18 | g 59 s 300 i |
| 24 | THF | 2 | 4.86 | 0.97 | 18.9 | |

We claim:
1. A liquid crystalline copolymer which contains, as copolymerized units, a comonomer of the formula:

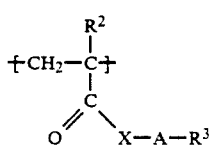

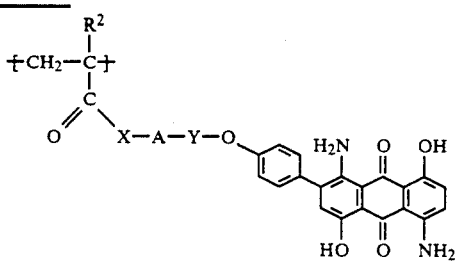

where X is a chemical bond, —O— or

wherein $R^1$ is hydrogen or $C_1$–$C_4$-alkyl, Y is a chemical bond or —CO—, A is a linear or branched $C_2$–$C_{20}$-alkylene group where the carbon chain of the alkylene group can be interrupted by —O— or

$R^2$ is hydrogen, methyl or chlorine and $R^3$ is a mesogenic group of the formula:

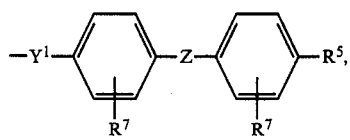

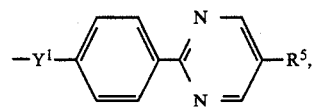

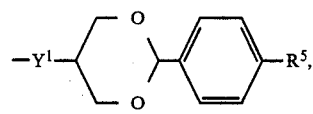

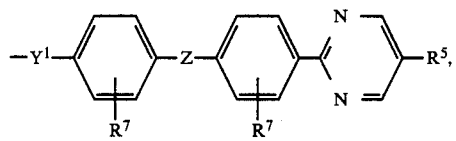

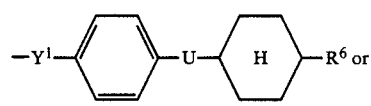

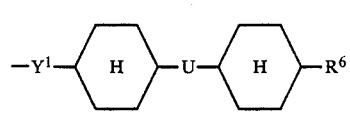

in which $Y^1$ is —O—,

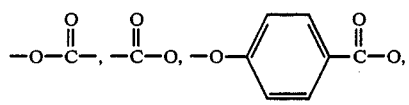

or —S—, Z is a chemical bond or a radical of the formula

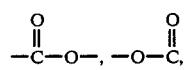

—CH=CH—, —N=N,

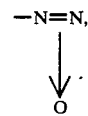

—N=CH— or —CH=N—, U is a chemical bond or radical of the formula:

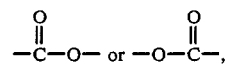

$R^5$ is hydrogen, $C_1$–$C_{12}$-alkyl, $C_5$–$C_7$-cycloalkyl, $C_1$–$C_{12}$-alkoxy, $C_4$–$C_{12}$-alkoxycarbonyl, $C_1$–$C_{12}$-alkanoyloxy, fluorine, chlorine, bromine, cyano, phenyl, 4-cyanophenyl or nitro, $R^6$ is hydrogen, $C_1$–$C_{12}$-alkyl, $C_1$–$C_{12}$-alkoxy or $C_1$–$C_{12}$-alkoxycarbonyl and $R^7$ is methyl, ethyl, methoxy, ethoxy or chlorine.

2. A liquid crystalline copolymer as claimed in claim 1 wherein A is a group of the formula —(CH$_2$)$_2$—, —(CH$_2$)$_3$—, —(CH$_2$)$_4$—, —(CH$_2$)$_5$—, —(CH$_2$)$_6$—, —(CH$_2$)$_7$—, —(CH$_2$)$_8$—, —(CH$_2$)$_9$—, —(CH$_2$)$_{10}$—, —(CH$_2$)$_{11}$—, —(CH$_2$)$_2$—O—, —(CH$_2$)$_2$—, —(CH$_2$)$_3$—O—(CH$_2$)$_2$—,

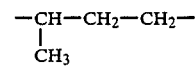

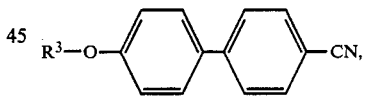

3. A liquid crystalline copolymer as claimed in claim 1, wherein, in the formula, $R^2$ is hydrogen or methyl, X is —O—, Y is a chemical bond, A is a linear $C_2$–$C_{20}$-alkylene group and $R^3$ is

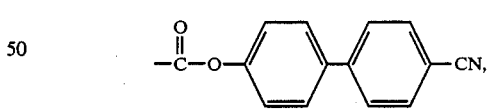

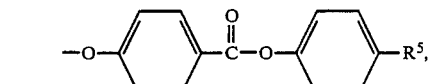

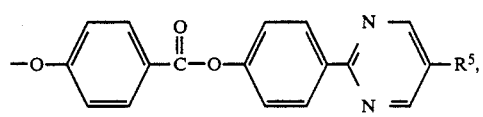

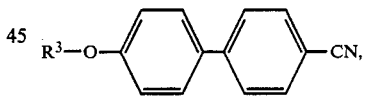

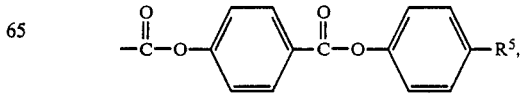

-continued

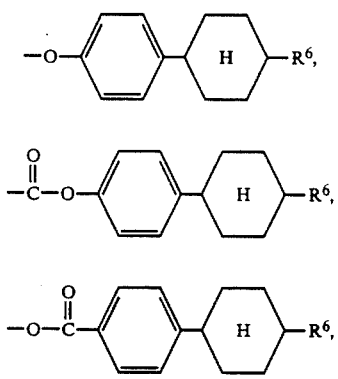

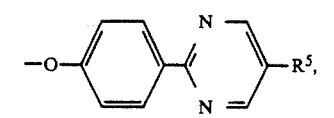

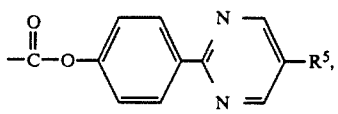

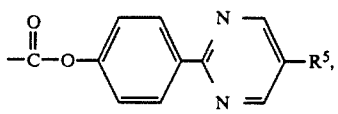

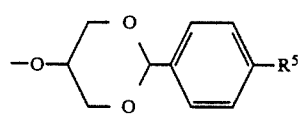

or

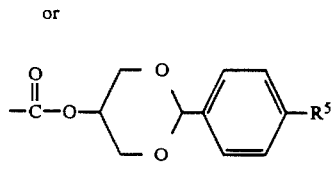

where $R^5$ is $C_1$–$C_{12}$-alkyl, $C_1$–$C_{12}$-alkoxy, $C_4$–$C_{12}$-alkoxycarbonyl, $C_1$–$C_{12}$-alkanoyloxy, fluorine, chlorine, cyano, phenyl, 4-cyanophenyl or nitro and $R^6$ is $C_1$–$C_{12}$-alkyl.

4. A liquid crystalline copolymer as claimed in claim 1, which contains from 0.5 to 40% by weight, based on the copolymer, of a dye containing radical.

5. A liquid crystalline copolymer as claimed in claim 2, which contains from 0.5 to 40% by weight, based on the copolymer, of a dye containing radical.

6. A liquid crystalline copolymer as claimed in claim 3, which contains from 0.5 to 40% by weight, based on the copolymer, of a dye containing radical.

7. A liquid crystalline copolymer which is of the formula

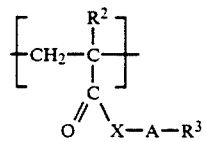

-continued

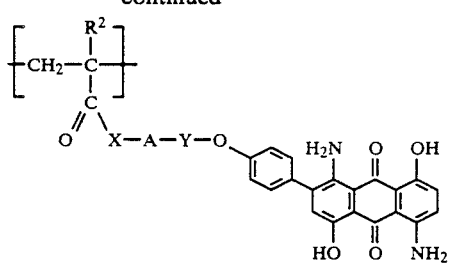

where $R^2$ is hydrogen or methyl, X is —O— Y is a chemical bond, A is a linear $C_2$–$C_{20}$-alkylene group, $R^3$ is

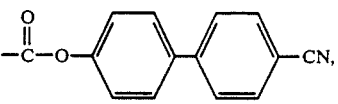

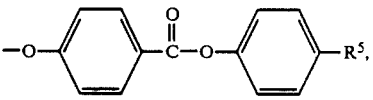

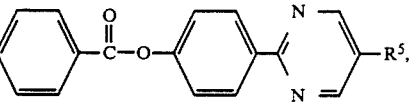

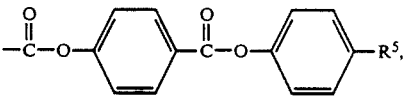

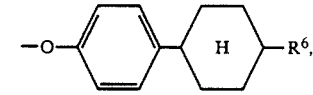

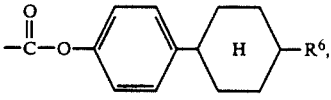

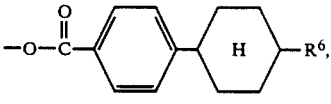

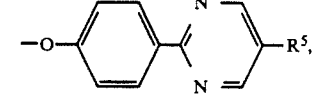

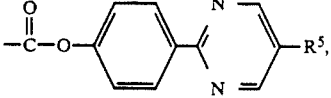

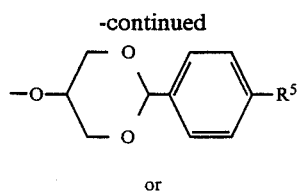

or

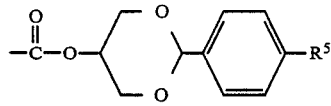

$R^5$ is $C_1$-$C_{12}$-alkyl, $C_1$-$C_{12}$-alkoxy, $C_4$-$C_{12}$-alkoxycarbonyl, $C_1$-$C_{12}$-alkanoyloxy, fluorine, chlorine, cyano, phenyl, 4-cyanophenyl or nitro and $R^6$ is $C_1$-$C_{12}$-alkyl, the copolymer containing from 0.5 to 40% by weight, based on the polymer, of a dye containing radical.

8. A liquid crystalline copolymer as claimed in claim 7, which carries various mesogenic groups $R^3$.

9. A liquid crystalline copolymer as claimed in claim 7, wherein A is a group of the formula —$(CH_2)_2$—, —$(CH_2)_3$—, —$(CH_2)_4$—, —$(CH_2)_5$—, —$(CH_2)_6$—, —$(CH_2)_7$—, —$(CH_2)_8$—, —$(CH_2)_9$—, —$(CH_2)_{10}$—, —$(CH_2)_{11}$—, —$(CH_2)_2$—O—$(CH_2)_2$—, —$(CH_2)_3$—O—$(CH_2)_2$—, $$-(CH_2)_2-\underset{\underset{CH_3}{|}}{N}-(CH_2)_2-,\ -\underset{\underset{CH_3}{|}}{CH}-CH_2- \text{ or}$$

$$-\underset{\underset{CH_3}{|}}{CH}-CH_2-CH_2-$$

10. A liquid crystalline copolymer as claimed in claim 8, wherein A is a group of the formula —$(CH_2)_2$—, —$(CH_2)_3$—, —$(CH_2)_4$—, —$(CH_2)_5$—, —$(CH_2)_6$—, —$(CH_2)_7$—, —$(CH_2)_8$—, —$(CH_2)_9$—, —$(CH_2)_{10}$—, —$(CH_2)_{11}$—, —$(CH_2)_2$—O—$(CH_2)_2$—, —$(CH_2)_3$—O—$(CH_2)_2$—, $$-(CH_2)_2-\underset{\underset{CH_3}{|}}{N}-(CH_2)_2-,\ -\underset{\underset{CH_3}{|}}{CH}-CH_2- \text{ or}$$

$$-\underset{\underset{CH_3}{|}}{CH}-CH_2-CH_2-$$

11. A liquid crystalline copolymer as claimed in claim 7, wherein $R^3$ is

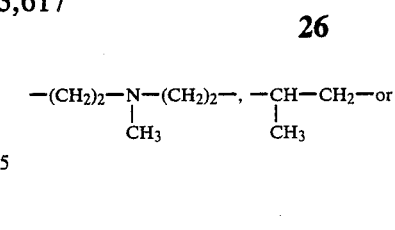

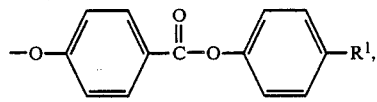

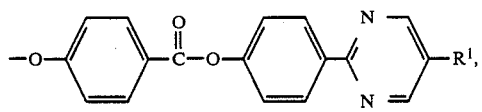

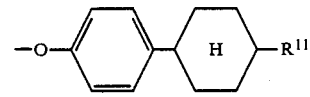

or

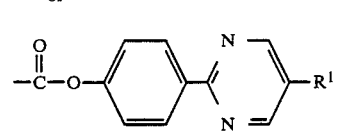

where R' is $C_1$-$C_{12}$-alkyl, $C_1$-$C_{12}$-alkoxy, cyano, phenyl or 4-cyanophenyl and R'' is $C_1$-$C_{12}$-alkyl, and the polymer can carry identical or different mesogenic groups $R^3$.

* * * * *